(12) United States Patent
Doit et al.

(10) Patent No.: US 9,039,291 B2
(45) Date of Patent: May 26, 2015

(54) DEVICE FOR CONNECTING OPTICAL FIBERS

(75) Inventors: Stéphane Doit, Chamonix (FR); Laurent Lagrange, Saint Pierre en Faucigny (FR)

(73) Assignee: Amphenol Socapex (FR)

( * ) Notice: Subject to any disclaimer, the term of this patent is extended or adjusted under 35 U.S.C. 154(b) by 15 days.

(21) Appl. No.: 13/502,641

(22) PCT Filed: Oct. 19, 2010

(86) PCT No.: PCT/FR2010/052222
§ 371 (c)(1),
(2), (4) Date: May 18, 2012

(87) PCT Pub. No.: WO2011/048322
PCT Pub. Date: Apr. 28, 2011

(65) Prior Publication Data
US 2012/0224815 A1   Sep. 6, 2012

(30) Foreign Application Priority Data
Oct. 19, 2009   (FR) ...................................... 09 57315

(51) Int. Cl.
*G02B 6/38*   (2006.01)
*G02B 6/32*   (2006.01)

(52) U.S. Cl.
CPC ................ *G02B 6/3873* (2013.01); *G02B 6/32* (2013.01); *G02B 6/327* (2013.01); *G02B 6/3846* (2013.01); *G02B 6/3853* (2013.01)

(58) Field of Classification Search
CPC ........ G02B 6/3873; G02B 6/32; G02B 6/327; G02B 6/3846; G02B 6/3853

USPC .......................................... 385/70, 72, 74, 78
See application file for complete search history.

(56) References Cited

U.S. PATENT DOCUMENTS

| | | | | |
|---|---|---|---|---|
| 4,451,115 A | * | 5/1984 | Nicia et al. ...................... | 385/74 |
| 4,632,505 A | * | 12/1986 | Allsworth ........................ | 385/61 |
| 4,781,431 A | * | 11/1988 | Wesson et al. .................. | 385/79 |
| 4,799,759 A | * | 1/1989 | Balyasny ......................... | 385/66 |
| 4,828,353 A | * | 5/1989 | Yamaguchi et al. ............ | 385/58 |
| 5,459,805 A | * | 10/1995 | Foster .............................. | 385/74 |
| 5,577,143 A | * | 11/1996 | Nodfelt et al. ................... | 385/61 |
| 6,655,850 B2 | * | 12/2003 | Mann et al. ...................... | 385/74 |
| 7,006,728 B1 | * | 2/2006 | Jiang et al. ...................... | 385/35 |
| 7,474,822 B2 | * | 1/2009 | Kobayashi et al. ............. | 385/35 |
| 7,775,725 B2 | * | 8/2010 | Grinderslev .................... | 385/74 |
| 2006/0013537 A1 | * | 1/2006 | Miyake et al. .................. | 385/60 |
| 2009/0135429 A1 | * | 5/2009 | Masuda ......................... | 356/477 |
| 2009/0324175 A1 | * | 12/2009 | Everett et al. ................... | 385/72 |

FOREIGN PATENT DOCUMENTS

| | | | |
|---|---|---|---|
| EP | 2065740 | A1 | 6/2009 |
| GB | 2013922 | A | 8/1979 |
| GB | 2263557 | A | 7/1993 |
| JP | 58-182611 | A | 10/1983 |
| WO | 2007/119036 | A1 | 10/2007 |

* cited by examiner

*Primary Examiner* — Daniel Petkovsek
(74) *Attorney, Agent, or Firm* — Blank Rome LLP

(57) ABSTRACT

An optical fiber connection device mainly made up of two coupling elements shaped to be inserted in cavities of two connector housings. Each coupling element (11A, 11B) includes a fiber bar (14) having an optical fiber segment (16) passing axially therethrough, and each bar is situated at a predetermined distance from a lens (13) held stationary in the corresponding coupling element; the two coupling elements include conical engagement endpieces.

14 Claims, 1 Drawing Sheet

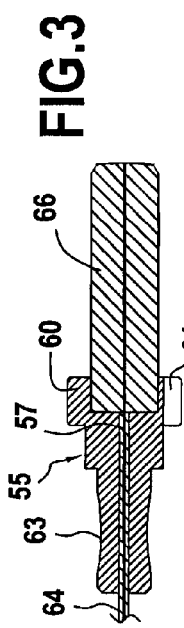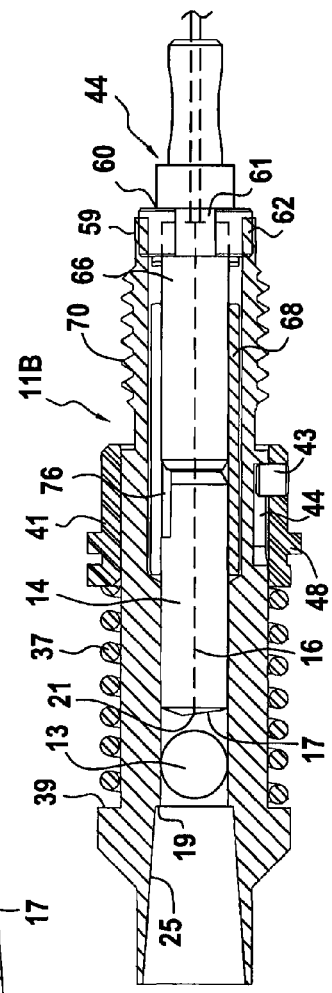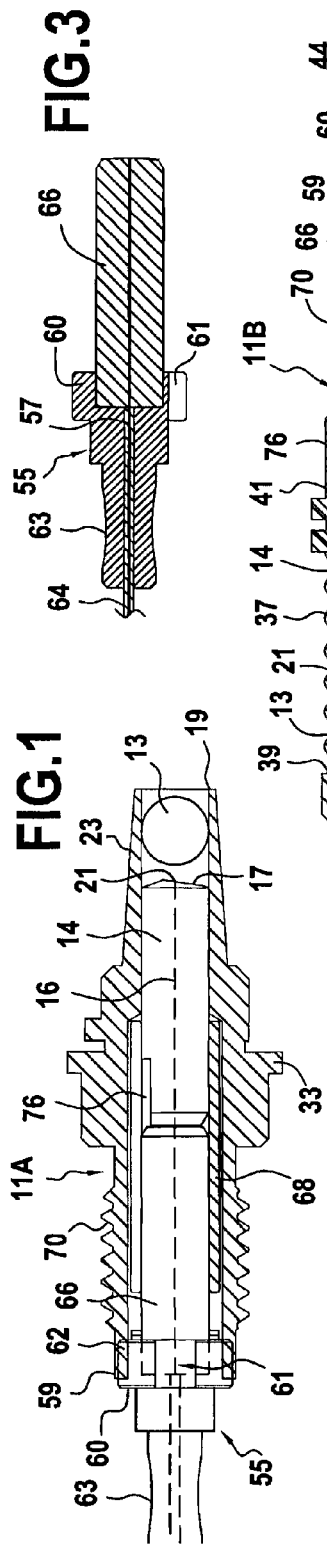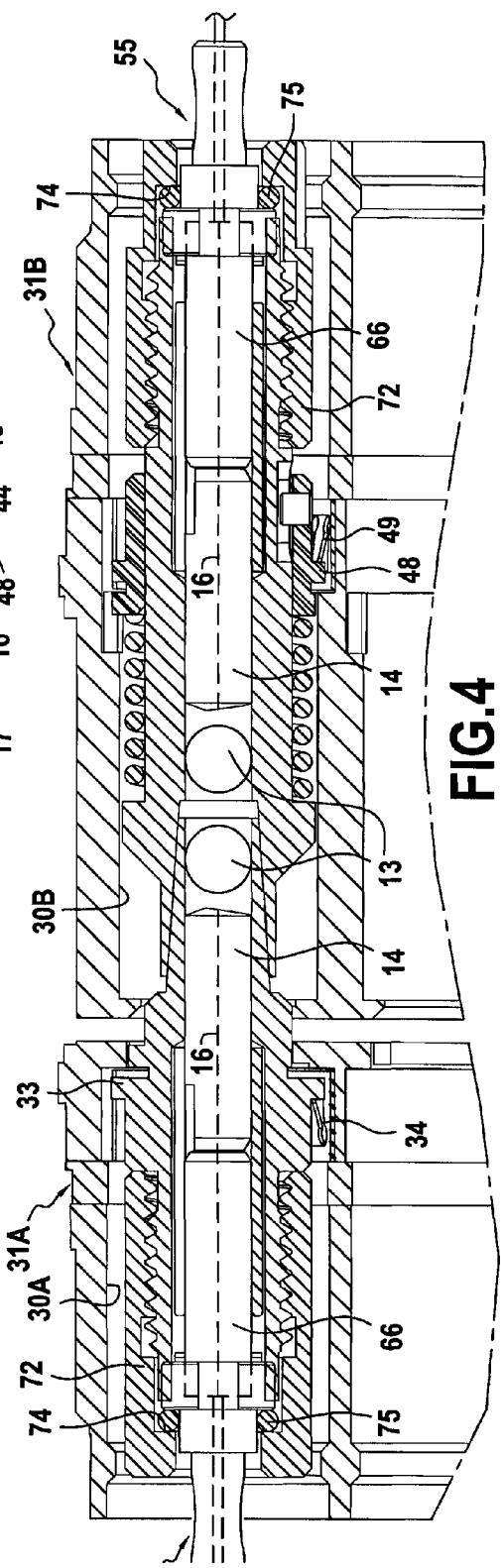

DEVICE FOR CONNECTING OPTICAL FIBERS

REFERENCE TO RELATED APPLICATION

This patent application is a national stage of PCT/FR 2010/052222, filed Oct. 15, 2009, which claims priority to French patent application No. 0957315 filed on Oct. 15, 2009, the entire disclosures of which are incorporated herein by reference.

The invention relates to an optical fiber connection device of the so-called "expanded beam" type comprising two tubular coupling elements, e.g. shaped to be inserted in respective cavities of two cooperating connector housings. The invention relates more particularly to an improvement making it possible to avoid any deterioration of the optical connection as a result of the ends of the optical fibers becoming dirtied and/or worn.

Optical fiber connection systems are known that are designed to be inserted in the cavities of connector housings (e.g. forming a plug and a socket), possibly in order to replace electrical contacts. By way of example, such connector housings may be provided with safe locking means, using a threaded ring and sleeve, a bayonet connection, or merely contact between said connectors.

Under severe utilization conditions (e.g. utilization in military equipment), an optical fiber connection may deteriorate and cause the optical link to become faulty. For example, a conventional fiber-to-fiber contact between the two portions of the connection system may lack reliability. It can happen that the ends of the optical fibers become dirty, which is very difficult to verify, given the extremely small diameter (a few micrometers) of the optical fibers that are used. Above all, it can happen that the polished ends of the optical fibers become worn and opaque under the effect of vibration. These defects give rise to transmission losses and they cannot be repaired by the user. Frequent laboratory inspections and reconditioning become necessary.

The invention makes it possible to improve a system that enables all of those problems to be solved.

More particularly, the invention provides an optical fiber connection device comprising two generally tubular coupling elements that are shaped to be inserted in respective cavities in two cooperating connector housings, the device being characterized in that each coupling element includes a fiber bar axially containing an optical fiber segment, in that the bar is in contact via one end with the end of a corresponding optical fiber, in that the other end of said bar is situated at a predetermined distance from a lens held stationary in said coupling element, and in that the coupling elements respectively include male and female conical engagement endpieces having the same cone angle, said lenses being at a desired distance apart from each other when said conical endpieces are in contact.

In order to ensure good contact between the conical endpieces, it is advantageous for one of the coupling elements to carry externally a spring mounted between a shoulder of said coupling element and a ring slidable thereon. Each ring cooperates with locking means in the corresponding connector housing. On assembly, the coupling element can thus be retracted by sliding relative to the ring that is held stationary, thereby compressing the spring. This provides contact under spring loading between said conical engagement endpieces.

In an embodiment, each coupling element receives an insert having an optical fiber passing axially therethrough. The role of the insert is to center the optical fiber upstream from the system, and numerous such inserts are known in the field of optical fibers. The insert is generally shaped to engage in axial sliding in one end of said coupling element, and it comprises a bar, itself having said optical fiber passing axially therethrough and having an end that comes into contact with a corresponding end of said fiber bar in order to establish fiber-to-fiber contact between said optical fiber passing through the insert and the optical fiber segment passing through said fiber bar. This contact is maintained under spring loading, e.g. as a result of an annular resilient gasket interposed between the coupling element and the insert. This internal connection between the optical fiber and the optical fiber segment in the fiber bar is thus completely stabilized and protected inside the coupling element.

Advantageously, the end of the fiber bar situated facing the lens has a slanted truncated conical shape. For example, the cone is truncated on a plane making an angle of 8° relative to its base. This feature prevents any fraction of the light beam returning via the optical line to the emitting source, and thus avoids disturbing the source.

Advantageously, the lens is constituted by a spherical bead. It is also possible to use a lens of the plano-convex type, i.e. that is cylindrical with its face that faces towards the outside having a spherical cap.

The above-mentioned bars may be made on the basis of the compressed ceramic known under the name "zirconia".

The invention can be better understood and other advantages thereof appear more clearly in the light of the following description of an optical fiber connection device in accordance with the principle of the invention, given by way of example and made with reference to the accompanying drawing, in which:

FIG. 1 is a longitudinal section view of one of the two coupling elements of the connection device;

FIG. 2 is a longitudinal section view of the other coupling element;

FIG. 3 is a detail view in section of an insert fitted to the end of the optical fiber and received in one or the other of the coupling elements; and FIG. 4 shows the coupling of the two coupling elements of FIGS. 1 and 2 inside cavities of two cooperating connector housings.

The optical fiber connection device of this example mainly comprises two metal coupling elements 11A, 11B, that are hollow and generally tubular, each presenting an axial passage housing the components that serve to transfer the light beam.

Each coupling element 11A, 11B houses a lens 13, e.g. a glass lens, and a fiber bar 14, e.g. made of "zirconia", axially including a rectilinear segment of optical fiber 16 that is open at each of its two opposite faces. In this example, the lens 13 is in the form of a spherical bead. The bar and the lens are held stationary inside the corresponding coupling element 11A, 11B. One end 17 of the bar 14 is situated at a predetermined distance from the lens. It can clearly be seen from the drawings that the lens as held stationary in this way close to the corresponding axial through orifice 19 serves to isolate and protect the facing end 21 of the optical fiber segment.

Externally, beside the corresponding lens, the coupling element 11A includes a male conical engagement endpiece 23, while internally, beside the corresponding lens 13 and in alignment therewith, the coupling element 11B includes a female conical engagement endpiece 25. The two conical engagement endpieces have cone angles that are the same or similar in order to enable them to be properly aligned relative to each other.

As can be seen in the example of FIG. 4, the two lenses 13 are at a predetermined distance from each other when the conical endpieces are in contact. The conical engagement ensures that the two coupling elements are accurately aligned.

For example, with a spherical lens 13 and when the two coupling elements 11A, 11B are engaged with their conical endpieces in contact, the distance between the centers of the two spherical beads, referred to as the focal length, may be twice the distance between the center of one spherical bead and the end 21 of the optical fiber segment 16 that is flush with the center of the face 17 of the corresponding bar 14. Thus, the light beam leaving the segment 14 is defocused by the first lens that it meets, constant between the two lenses, and refocused by the second lens onto the end of the other optical fiber segment. Since the two lenses 13 do not touch each other, any risk of wear as a result of impacts or vibration is eliminated. If one of the beads becomes dirtied in its portion adjacent to the orifice 19, it can easily be cleaned by a simple "cotton bud" soaked in alcohol and dry air.

In this example, the coupling elements 11A, 11B are designed and shaped for mounting in corresponding cavities 30A, 30B of the two connector housings 31A, 31B. The coupling element 11A includes a collar 33 that co-operates with a retention element 34 for holding it stationary in the cavity 30A. Externally, the other coupling element 11B carries a spring 37 mounted between a shoulder 39 of said coupling element and a ring 41 slidable on said coupling element. The ring co-operates with locking means in the housing of the corresponding connector 31B, enabling said conical engagement endpieces 23 and 25 to be put into contact under spring loading. More precisely, the ring 41 includes a lug 43 that is slidable in an external groove 44 of the coupling element. By means of the groove 44 and because of geometrical elements of the cavities 30A and 30B, the lug 43 also serves to determine the orientation of the coupling elements 11A and 11B relative to each other. This groove extends longitudinally, thereby defining the stroke of the ring 41. The spring 37 is mounted with a small amount of compression prestress between the shoulder 39 and the ring 41. The ring also includes a collar 48 that co-operates with a retention element 49 for holding it in the cavity 30B. Thus, when the two coupling elements 11A, 11B are respectively housed in the cavities 30A, 30B of the housings 31A, 31B, and when the housings are connected together (FIG. 4), the coupling element 11B moves back within the cavity 30B, further compressing the spring 37, thereby ensuring contact between said conical engagement endpieces 23 and 25 under spring loading.

In this example, each coupling element 11A, 11B receives an insert 55 (FIG. 3) having an optical fiber 57 passing axially therethrough and shaped to be engaged in axial sliding at one end 59 of said coupling element remote from the end that includes the conical engagement endpiece. The lugs 62 of the coupling elements 11A and 11B serve to determine the orientation of the insert 55 and to prevent them from moving before threaded sleeves 72 are put into place. By way of example, the insert includes, for this purpose, a collar 60 having notches 61 that receive lugs 62 defined at the end 59 of the coupling element opposite from its end where the conical endpiece is defined. The insert 55 includes a metal portion having said notched collar 60 and also having a sleeve 63 suitable for being deformed by crimping in order to hold the optical fiber in position. The optical fiber is protected by a sheath 64 that engages in the metal portion of the insert as far as a bar 66 projecting from the other end of the metal portion. The optical fiber 57 passes axially through the bar and its end comes flush with the end of the bar 66. The end of the bar comes axially into contact with a corresponding end of said fiber bar 14 to establish end-to-end contact between said optical fiber 57 passing through the insert and the segment of optical fiber 16 passing through the fiber bar. A semirigid tubular sleeve 68, e.g. made of zirconia, is mounted around the two bars 14 and 66 in order to hold them in alignment. This tubular sleeve is split longitudinally.

Each coupling element includes an external thread 70 onto which there is screwed a threaded sleeve 72 provided with an annular end shoulder 74 that bears against the insert in order to hold the two above-mentioned bars in end-to-end contact. In this example, a resilient gasket 75 is interposed between the annular shoulder and the insert.

Furthermore, the end of the fiber bar 14 situated facing the lens is in the shape of a slanting truncated cone so as to prevent any fraction of the light beam being reflected through the optical line to the emitting source, and thus avoid disturbing it. Nevertheless, the optical fiber segment 16 emerges at and comes flush with the center of the end of the fiber bar.

Each fiber bar includes a flat 76 that serves, with the help of specific tooling, to ensure that the bar is properly oriented on assembly, and more particularly to ensure that the truncated cone formed at the end of the bar is properly oriented.

After the two coupling elements 11A, 11B have been axially engaged, i.e. when they are in the situation shown in FIG. 4, so-called "fiber to fiber" light transmission is replaced by a de-focusing/focusing system without contact, thus making it possible to avoid all of the above-mentioned drawbacks.

The invention claimed is:

1. An optical fiber connection device comprising two coupling elements that are shaped to be inserted in respective cavities in two cooperating connector housings, each of the two coupling elements comprising:
   a first bar having a first end and a second end and axially containing an optical fiber segment, wherein the first bar is a fiber bar, the first end of said first bar is in contact with an end of a corresponding optical fiber, and the second end of said first bar is situated at a predetermined distance from a lens held stationary in said coupling element,
   wherein the coupling elements respectively include male and female conical engagement endpieces having the same cone angle, said lenses being at a desired distance apart from each other when said conical endpieces are in contact.

2. A connection device according to claim 1, wherein one of the coupling elements carries externally a spring mounted between a shoulder of said coupling element and a ring slidable on said coupling element, said ring co-operating with locking means in the housing of the corresponding connector enabling said conical engagement endpieces to be put into contact under spring loading.

3. A connection device according to claim 1, wherein each coupling element includes an insert having an optical fiber passing axially therethrough and shaped to engage in axial sliding in one end of said coupling element, and said insert comprises a second bar having said optical fiber passing axially therethrough and having its end coming axially into contact with a corresponding end of said first bar in order to establish end-to-end contact between said optical fiber passing through the insert and said optical fiber segment passing through said first bar.

4. A connection device according to claim 3, wherein a semirigid tubular sleeve is mounted around the first and second bars to hold them in alignment.

5. A connection device according to claim 4, wherein said tubular sleeve is split longitudinally.

6. A device according to claim 3, wherein each coupling element includes an external thread on which an internally threaded sleeve is screwed, the sleeve being provided with an annular end shoulder bearing against said insert to hold the first and second bars in end-to-end contact.

7. A device according to claim 6, wherein a resilient gasket is interposed between said annular shoulder and said insert.

8. A device according to claim 1, wherein the second end of the first bar has a slanting truncated conical shape.

9. A device according to claim 8, wherein said first bar includes a flat for determining its orientation on assembly.

10. A device according to claim 1, wherein each lens is in the form of a spherical bead.

11. An optical fiber connection device comprising two coupling elements that are shaped to be inserted in respective cavities in two cooperating connector housings, each of the two coupling elements comprising:
   a first bar having a first end and a second end and axially containing an optical fiber segment, wherein the first bar is a fiber bar, the first end of said first bar is in contact with an end of a corresponding optical fiber, and the second end of said first bar is situated at a predetermined distance from a lens held stationary in said coupling element,
   wherein the coupling elements respectively include male and female conical engagement endpieces having the same cone angle, said lenses being at a desired distance apart when the conical endpieces are in contact, and
   wherein the second end of the first bar has a slanting truncated conical shape.

12. An optical fiber connection device for optically connecting two optical fibers, comprising:
   a female coupling element including a lens and a female engagement endpiece, the female engagement endpiece having an inner surface with a conical shape defining a cone angle; and
   a male coupling element including a lens and a male engagement endpiece, the male engagement endpiece having an outer surface with a conical shape defining a cone angle, said male engagement endpiece configured to slidably engage with the female engagement endpiece, wherein the cone angle of the male engagement endpiece is the same as the cone angle of the female engagement endpiece such that the outer surface of the male engagement endpiece maintains contact with the inner surface of the female engagement endpiece when the optical fibers are optically connected.

13. A device according to claim 12, further comprising a fiber bar axially containing a fiber segment, wherein an end of the fiber bar proximate to the lens has a slanting truncated conical shape.

14. A device according to claim 12, wherein the outer surface of the male engagement endpiece and the inner surface of the female engagement endpiece cooperate to maintain a desired distance between said lenses.

* * * * *